United States Patent [19]

Patera et al.

[11] Patent Number: 5,312,138
[45] Date of Patent: May 17, 1994

[54] DRAIN HOSE ASSEMBLY FOR AN AUTOMATIC WASHER

[75] Inventors: John L. Patera; Cindy K. Williams, both of St. Joseph Township, Berrien County, Mich.; Lawrence N. Mears, Solon, Ohio

[73] Assignee: Whirlpool Corporation, Benton Harbor, Mich.

[21] Appl. No.: 914,346

[22] Filed: Jul. 17, 1992

[51] Int. Cl.$^5$ .............................................. F16L 25/00
[52] U.S. Cl. ..................................... 285/12; 285/280; 285/423; 285/921
[58] Field of Search ................. 285/12, 168, 275, 280, 285/903, 921, 260, 423

[56] References Cited

U.S. PATENT DOCUMENTS

| | | | |
|---|---|---|---|
| 2,282,847 | 5/1942 | Bariffi | 68/53 |
| 2,366,067 | 12/1944 | Smith | 285/921 X |
| 2,755,652 | 7/1956 | Shelton et al. | 68/184 |
| 2,985,469 | 5/1961 | Bowman | 285/921 X |
| 4,099,744 | 7/1978 | Kutnyak | 285/921 X |
| 4,151,864 | 5/1979 | Thurman | 138/106 |
| 4,222,594 | 9/1980 | Skinner | 285/903 X |
| 4,415,389 | 11/1983 | Medford et al. | 156/91 |
| 4,625,998 | 12/1986 | Draudt | 285/903 X |
| 4,722,556 | 2/1988 | Todd | 285/12 |
| 4,747,621 | 5/1988 | Gans et al. | 285/275 X |
| 4,870,988 | 10/1989 | Hood, Jr. et al. | 137/343 |

FOREIGN PATENT DOCUMENTS 928911  6/1963  United Kingdom ............... 285/921

Primary Examiner—Dave W. Arola
Attorney, Agent, or Firm—Thomas E. Turcotte; Stephen D. Krefman; Thomas J. Roth

[57] ABSTRACT

A drain hose assembly for an automatic washer comprising a flexible corrugated plastic hose having an end inter-connectable with the automatic washer and a second barbed connection end insertable into a tubular elastomeric connection member such that a rotatable sealable connection is provided between the barbed connection end and the tubular elastomeric connection member. A flexible corrugated plastic extension member may be provided having the tubular elastomeric connection member integrally molded onto one end. The extension member may have, at the end opposite the elastomer connection member, a barbed connection end for further interconnections. The extension member may therefore, be sealably and rotatably connected to the drain hose for adding length. An elastomeric tubular nozzle formed into an approximate 180° arc and having an enlarged end including the formed elastomeric connection member may be provided for providing a discharge end to the drain hose assembly. The nozzle may therefore, interconnect with either the drain hose or extension member and may swivel relative to the drain hose or extension member to ease washer installation.

10 Claims, 2 Drawing Sheets

1

DRAIN HOSE ASSEMBLY FOR AN AUTOMATIC WASHER

BACKGROUND OF THE INVENTION

1. Field of Invention

The present invention relates to automatic washers and more particularly to the drainage connection system between the pump of the automatic washer and a drain.

2. Description of Prior Art

In automatic washers, drain hoses provide a discharge conduit from a drain pump to a drain. Typically, the drain consists of a stand pipe drain or a drain tub and the drain hoses have a discharge end which has a bend of 90° to 180° to assist in connection to the drain.

Historically, drain hoses for automatic washing machines and similar devices were made of rubber tubing. A rigid bend of 90° to 180° was formed in the discharge end of the rubber tubing or a piece of metal tubing, having a bend of 90° to 180°, was inserted in the discharge end of the rubber tubing. This arrangement had several drawbacks. Primarily the heavy rubber or neoprene tubing is expensive, prone to kinking, and is excessively stiff. Additionally, the length of this type of drain hose can be lengthened only by use of special fittings and clamps.

Recently, drain hoses for automatic washing machines have been made of molded and extruded corrugated plastic hose. This type of plastic hose is less expensive, resists kinking, and is more flexible than the heavy neoprene hoses. However, it is not possible to form a permanent bend at the discharge end due to manufacturing methods of the plastic hose. Therefore, a wire retainer is normally used to hold the plastic hose in a 180° arc to provide a bend in the discharge end of the plastic hose. The corrugated plastic hose design also has a number of drawbacks. The plastic hose, because of its light weight, may not be securely retained in the drain under the influence of water thrust and vibration during pumping of the water from the machine. In addition the plastic hose may be damaged from friction which occurs as a result of vibration and movement of the hose in the drain. Furthermore, the standard wire adapter is typically intended for assembly to the corrugated hose by the user which can result in misassembly of the wire retainer onto the hose or a failure to use the wire retainer. Finally, this type of drain hose design does not accommodate additions in length for those installations requiring longer drain hoses.

What is needed therefore, is a drain hose assembly which allows use of the preferred plastic hose but overcomes the above mentioned drawbacks. Accordingly, an object of the present invention is to provide a drain hose assembly which allows use of a plastic hose and provides a bent discharge end for securing in the drain. Another object of the present invention is to provide a discharge end of a plastic hose which under the influence of water thrust and vibration during pumping water from the machine may be securely position in the drain. Another object of the present invention is to provide a plastic drain hose assembly having a discharge end which may be swiveled to ease installation. A further object of the present invention is to provide a plastic drain hose assembly having a discharge end which does not require user assembly. A further object of the invention is to provide a drain hose assembly which can be easily increased in length.

SUMMARY OF THE INVENTION

The present invention comprises a drain hose assembly having a flexible corrugated plastic drain hose provided with a barbed connection end insertable into a tubular elastomeric connection member such that a rotatably sealable connection is provided between the barbed connection end and the tubular elastomeric connection member. A flexible corrugated plastic extension member may be provided having the tubular elastomeric connection member integrally molded onto one end. The extension member may have, at the end opposite the elastomer connection member, a barbed connection end for further interconnections. The extension member may therefore, be sealably and rotatably connected to the drain hose for adding length. A nozzle for providing a discharge end to the drain hose may be provided. The nozzle is an elastomeric tubular member formed into an approximate 180° arc and has an enlarged end comprising the formed elastomeric connection member. The nozzle may therefore, interconnect with either the drain hose or extension member and may swivel relative to the drain hose or extension member to ease installation.

DESCRIPTION OF THE PREFERRED EMBODIMENT

Figure 1:
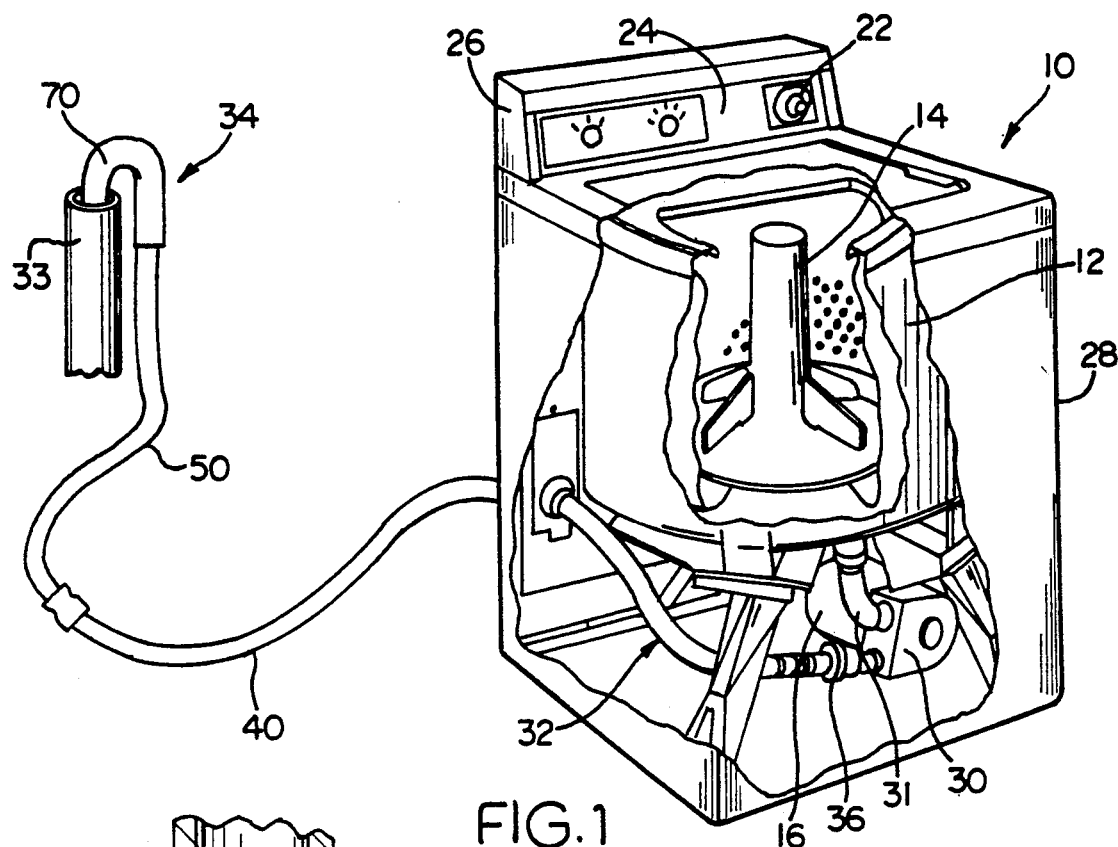
FIG. 1 is a perspective view with parts cut away of an automatic washer showing the drain hose assembly of the present invention.

Referring now to the drawings and in particular FIG. 1, a washing machine is generally shown at 10 as having a tub 12 with a vertical agitator 14 therein, a water supply (not shown), a power supply (not shown), an electrically driven motor 16 operably connected via a transmission to the vertical agitator 14, and controls including a presettable sequential control means 22 for use in selectively operating the washing machine 10 through a programmed sequence of washing, rinsing and extracting steps. The presettable sequential control means 22 is mounted to a panel 24 of a console 26 on the washing machine 10.

The washing machine 10 has an exterior cabinet 28 which encloses the mechanism of the washer. A pump 30 is operably connected to the electrically driven motor 16 and is used to pump soiled wash liquid from the washing machine tub 12 and pump inlet conduit 31 through a drain conduit 32 to a drain hose assembly 34. The drain hose assembly comprises a drain hose 40, an extension member 50 and a nozzle 70.

Figure 2:
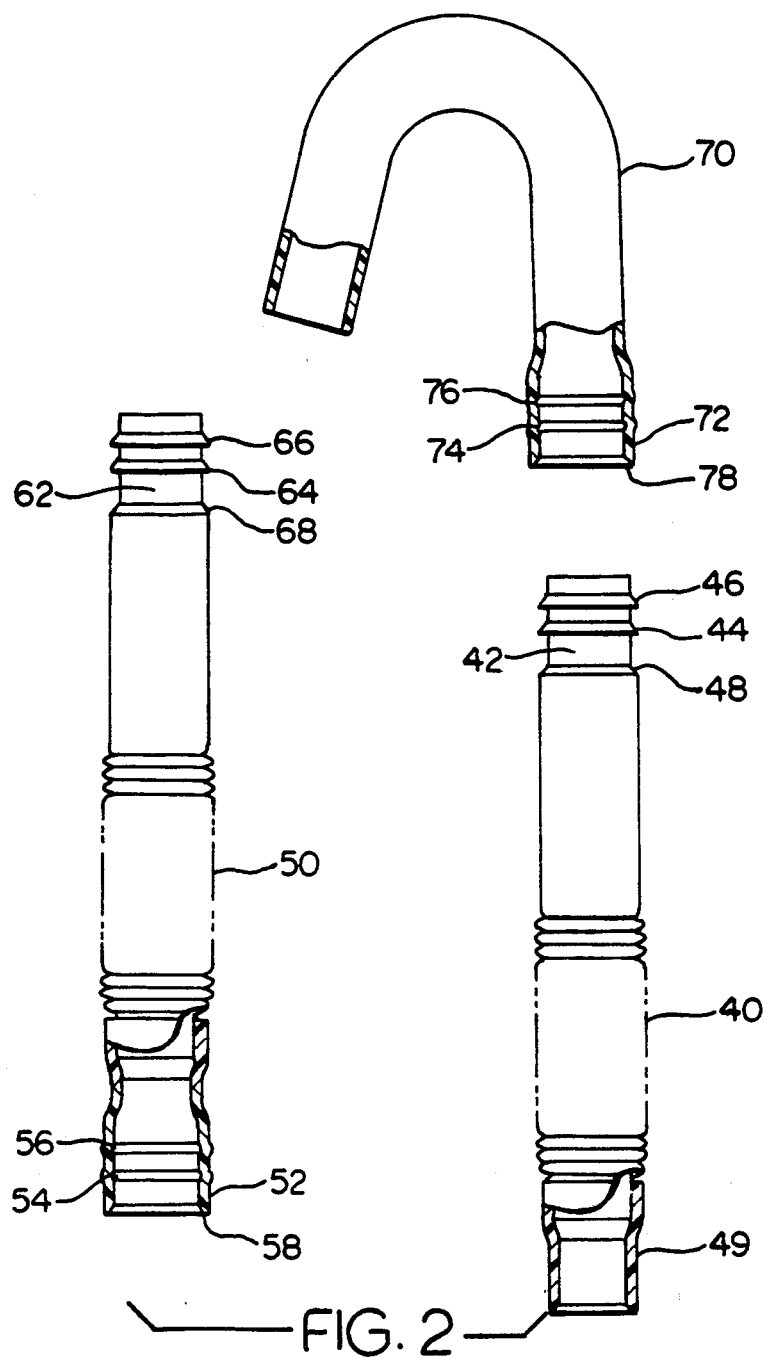
FIG. 2 is an exploded elevational view with parts cut away of the drain hose assembly of FIG. 1.

The drain hose 40, shown in further detail in FIG. 2, is a plastic hose with conventional corrugations having a barbed end 42. Disposed on the barbed end 42 are a plurality of external annular barbs 44 46 and hose end shoulder 48. Elastomeric end 49, located opposite the barbed end 42, is integrally molded to the drain hose 40 for connection to an outlet member (not shown) of the automatic washer.

The extension member 50, shown in greater detail in FIG. 2, is a plastic hose with conventional corrugation having an integrally molded elastomeric end 52 for receiving the barbed connection end 42 of the drain hose 40. The elastomeric end 52 comprises a tubular elastomeric connection member having a plurality of internal annular channels 54 56 corresponding to the external barbs 44 46 of the drain hose 40. Visual inspection for identifying correct engagement of the external barbs 44 46 and the channels 54 56 is possible by observing the proximity of end surface 58 of the elastomeric end 52 to the hose end shoulder 48. The extension member 50 has a barbed end 62 opposite the elastomeric end 52. The barbed end 62, preferably similar to the barbed end 42 of the drain hose 40, has a plurality of external annular barbs 64 66 and a hose end shoulder 68.

The nozzle 70, shown in further detail in FIG. 2, is a tubular elastomeric member formed in an approximate 90° to 180° arc having an elastomeric end 72 for receiving the barbed end 62 of the extension member 50 or the barbed end 42 of drain hose 40. The elastomeric end 72 comprises a tubular elastomeric connection member containing a plurality of internal annular channels 74 76 corresponding to the external barbs 64 66 of the extension member 50 or external barbs 44 46 of drain hose 40 and having an end surface 78. The elastomeric end 72 is preferably similar to elastomeric end 52 of the extension member 50.

Figure 3:
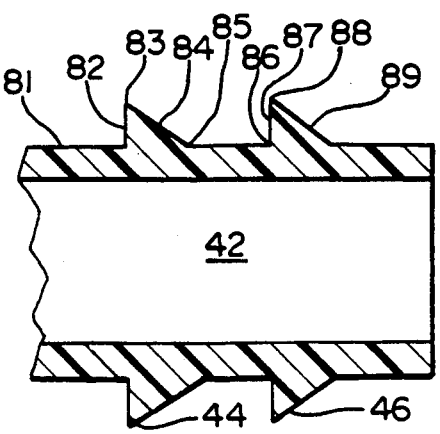
FIG. 3 is an enlarged cross-section of the barbed connection end of the drain hose of FIG. 2.

FIG. 3 shows the external annular barbs 44 46 of the barbed end 42 of the drain hose 40 in more detail. As stated above, barbed end 62 of the extension member 50 is substantially identical to the barbed end 42 of the drain hose 40 and the following description generally describes both barbed ends 42 62. The barbs 44 46 have a profile which includes a first wall 82 extending perpendicularly from an outer surface 81 of the barbed end 42 to a first predetermined point 83. A second wall 84 extends from the first predetermined point 83 to a second predetermined point 85 on the outer surface 81 such that the intersection of the second wall 84 and the outer surface 81 forms an angle less than or equal to 45°. A third wall 87 extends perpendicularly from a third predetermined point 86 to a fourth predetermined point 88. A fourth wall 89 extends from the fourth predetermined point 88 to the outer surface 81 such that the intersection of fourth wall 89 and the outer surface 81 forms an angle less than or equal to 45°. Having the interconnection of the second wall 84 and the fourth wall 89 with the outer surface 81 forming an angle of less than 45° ensures that the barbed end 42 will be insertable into the elastomeric ends 52 72 without undue force.

The distance between the second and third predetermined points 85 and 86 on the outer surface 81 is such as to optimally provide for a sealable and rotatable interconnection between the barbed ends 42 62 of the drain hose 40 and the extension member 50 respectively, and the elastomeric ends 52 72 of the extension member 50 and the nozzle 70 respectively, and may be approximately 5 mm.

Figure 4:
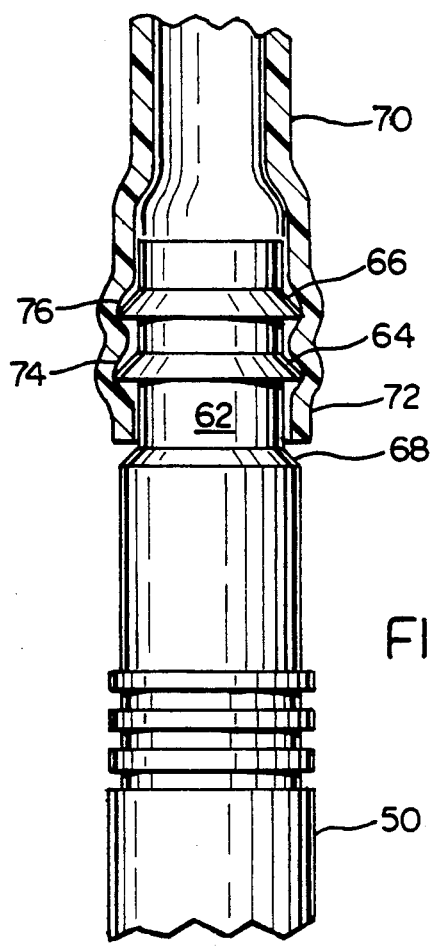
FIG. 4 is an enlarged cross-section of the barbed connection end of the drain hose of FIG. 2 inserted into the tubular elastomeric connection member of the nozzle of FIG. 2.

Connection means between the extension member 50 and the nozzle 70, which is substantially similar to connection means between drain hose 40 and extension member 50, is shown in more detail in FIG. 4. When the barbed end 62 of the extension member 50 is inserted into elastometric end 72 of the nozzle 70, the elastometric end 72 resiliently expands to receive the plurality of barbs 64 66. Upon engagement of the barbs 64 66 with the channels 74 76, the elastometric end 72 resiliently retracts about the barbed connection end 62. Resilient interference contact between the barbed end 62 and the elastometric end 72 occurs along the outer periphery of the barbs 64 66. This contact is such that a sealing relationship between the extension member 50 and the nozzle 70 is established. Additionally, the contact is of limited area such that rotation of the nozzle 70 relative to the extension member 50 can be accomplished. In the present invention, the nozzle 70 may be swivelled 360° relative to the extension member 50. The placement of the barbs 64 66 in the internal channels 74 76 is such that opposition to a force tending to disengage the extension member 50 and the nozzle 70 is provided.

The design of the barbed ends 42 62 of the drain hose 40 and the extension member 50 respectively, and the elastometric ends 52 72 of the extension member 50 and the nozzle 70, respectively, are constructed to be substantially similar such that any barbed end 42 62 may be sealably and rotatably connected with any elastomeric end 52 72. The connection means described above is preferably utilized to connect the integrally molded elastometric end 52 of the extension member 50 to the barbed connection end 42 of the drain hose 40. In this manner, the extension member 50 may be sealably and rotatably connected to the drain hose 40 for adding length to the drain hose 40. A plurality of extension members 50 may be additionally connected to each other in like fashion to provide additional length. As described above, the nozzle 70 may be sealable and rotatably connected to the barbed end 62 of the extension member 50 for providing a discharge end to the completed drain hose assembly 34. Therefore, a segmentally expandable hose design may be provided. Another arrangement may be provided with the nozzle 70 connected directly to the drain hose 40 such that the drain hose 40 is provided with a discharge end having the benefits of the above described nozzle.

Although the present invention has been described with reference to a specific embodiment, those of skill in art will recognize that changes may be thereto without departing from the scope and spirit of the invention as set forth in the appended claims.

The embodiments of the invention in which an exclusive property or privilege is claimed are defined as follows:

1. A drain hose assembly for an automatic washer comprising:
    a flexible corrugated plastic drain hose having a first end interconnectable with said automatic washer, said drain hose further having a second end having two annular barbs externally disposed thereon;
    a tubular elastomeric nozzle having a third end interconnectable with said second end, said nozzle further having a fourth end comprising a discharge end for said drain hose assembly, said third end having two annular channels internally disposed therein having a profile for engaging said two annular barbs; and
    said second end and said third end being sized such that upon insertion of said second end into said third end resilient interference sealing contact occurs between said second end and said third end only between the outer annular periphery of said two barbs and said two annular channels such that said second end and said fourth end are sealably and rotatably engaged.

2. A drain hose assembly as claimed in claim 1 wherein said nozzle has a curved shape and is formed in an approximate 180 degree arc.

3. A drain hose assembly as claimed in claim 1 wherein said second end further comprises a cylindrical portion having a substantially smooth outer surface having a predetermined outer diameter with said two annular barbs disposed on said outer surface.

4. A drain hose assembly as claimed in claim 1 wherein said profile of each of said two barbs further comprises:
 a first wall extending perpendicularly from said outer surface to a first predetermined point;
 a second wall extending from said first predetermined point toward a second predetermined point on said outer surface wherein the angle formed between said first wall and said second wall is greater than 45°.

5. A drain hose assembly as claimed in claim 1 wherein said two barbs are approximately 5 mm axial distance apart for optimal interaction with said two annular channels.

6. A drain hose assembly as claimed in claim 1 wherein said third end comprises a cylindrical elastomeric connection member having a predetermined inner diameter substantially equal to said predetermined outer diameter of said cylindrical portion of said second end and further having a substantially smooth inner surface with said two annular channels disposed on said inner surface.

7. A drain hose assembly as claimed in claim 6 wherein said two annular channels have an inner diameter substantially less than the outer diameter of said barbs for engaging said barbs such that said sealable and rotatable contact occurs between the outer diameter of said barbs and inner diameter of said two annular channels.

8. A drain hose assembly as claimed in claim 1 further comprising:
 a flexible corrugated plastic extension member having a fifth end interconnectable with said second end and further having a sixth end interconnectable with said third end, said fifth end being substantially similar to said third end and said sixth end being substantially similar to said second end;
 said second end being insertable into said fifth end such that said drain hose is sealably and rotatably engaged with said extension member in the same manner as with said third end, and said sixth end being insertable into said third end such that said extension member is sealably and rotatably engaged with said nozzle in the same manner as said nozzle is engaged with said second end.

9. A drain hose assembly as claimed in claim 1 further comprising exactly two barbs and exactly two annular channels.

10. A drain hose assembly for an automatic washer comprising:
 a flexible corrugated plastic drain hose having a first end interconnectable with said automatic washer, said drain hose further having a second end;
 a flexible corrugated plastic extension member having a third end interconnectable with said second end and further having a fourth end;
 said second and said fourth end being identical and having a cylindrical portion having an outer diameter and further having a substantially smooth outer surface;
 a nozzle comprising a tubular elastomeric member formed into an approximate 180 degree arc, said nozzle having a fifth end interconnectable with said fourth end and having a sixth end comprising a discharge end for said drain hose assembly;
 said third end and said fifth end being identical and comprising a cylindrical elastomeric connection member having an inner diameter substantially equal to said outer diameter of said cylindrical portion of said second end and said fourth end and further having a substantially smooth inner surface;
 means for sealably and rotatably connecting said drain hose and said extension member and said nozzle comprising:
  at least two annular barbs externally disposed on both said second end and said fourth end, said barbs further comprising:
   a first wall extending perpendicularly from said outer surface to a first predetermined point;
   a second wall extending from said first predetermined point at an angle equal to or greater 45 degrees to a second predetermined point on said outer surface;
  said profile extends annularly around said cylindrical member for forming said barbs such that said barbs have outer diameters at said first predetermined point;
  at least two channels internally disposed on said third end and said fifth end having a maximum inner diameter;
  said second end being insertable into said third end and said forth end being insertable into said fifth end such that sealable and rotatable resilient interference contact occurs only between said outer diameters of said barbs of said second end and said maximum inner diameters of said channels of said third end, and said fourth end being insertable into said fifth end such that sealable and rotatable contact occurs only between said outer diameters of said barbs of said fourth end and said maximum inner diameters of said channels of said fifth end.

* * * * *